(12) United States Patent  
Saik

(10) Patent No.: US 8,945,402 B2
(45) Date of Patent: Feb. 3, 2015

(54) APPARATUS AND METHOD FOR THE TREATMENT OF OIL, WATER, CUTTINGS, SAND, SOIL AND CLAY MIXTURES

(76) Inventor: Larry Saik, Innisfree (CA)

( * ) Notice: Subject to any disclaimer, the term of this patent is extended or adjusted under 35 U.S.C. 154(b) by 821 days.

(21) Appl. No.: 13/156,325

(22) Filed: Jun. 8, 2011

(65) Prior Publication Data

US 2011/0303622 A1    Dec. 15, 2011

Related U.S. Application Data

(60) Provisional application No. 61/354,162, filed on Jun. 11, 2010.

(51) Int. Cl.

| | | |
|---|---|---|
| C02F 1/00 | (2006.01) | |
| B01D 37/00 | (2006.01) | |
| B01D 15/00 | (2006.01) | |
| E21B 21/06 | (2006.01) | |
| B01D 21/26 | (2006.01) | |
| B09C 1/00 | (2006.01) | |
| B09C 1/02 | (2006.01) | |
| C10G 53/02 | (2006.01) | |

(52) U.S. Cl.
CPC .............. B01D 21/267 (2013.01); B09C 1/00 (2013.01); B09C 1/02 (2013.01); C10G 53/02 (2013.01); E21B 21/065 (2013.01); B01D 2221/04 (2013.01); B03D 2203/006 (2013.01)
USPC ........... 210/806; 210/173; 210/199; 210/201; 210/202; 210/259; 210/513; 210/726; 210/727; 210/738; 210/804; 210/512.1; 210/512.2; 210/97; 210/788; 210/195.1; 175/66; 175/206; 175/207

(58) Field of Classification Search
CPC ........ B01D 21/01; B01D 21/08; B01D 21/16; B01D 21/50; B01D 2201/04; C02F 1/52; C02F 1/5281; E21B 21/063; E21B 21/066; E21B 21/065; E21B 21/068
USPC ......... 210/173, 199, 201, 202, 259, 513, 726, 210/727, 738, 804, 806, 512.1, 788, 195.1, 210/805, 97, 739, 512.2; 175/66, 206, 207
See application file for complete search history.

(56) References Cited

U.S. PATENT DOCUMENTS

| | | | | |
|---|---|---|---|---|
| 3,723,309 | A * | 3/1973 | Garcia | 210/704 |
| 5,107,874 | A * | 4/1992 | Flanigan et al. | 210/512.2 |
| 5,454,957 | A * | 10/1995 | Roff, Jr. | 210/768 |
| 5,582,727 | A * | 12/1996 | Foster | 210/258 |
| 5,882,524 | A * | 3/1999 | Storey et al. | 210/712 |
| 6,527,960 | B1 * | 3/2003 | Bacon et al. | 210/741 |
| 6,863,809 | B2 * | 3/2005 | Smith et al. | 210/202 |
| 2003/0136747 | A1 * | 7/2003 | Wood et al. | 210/774 |
| 2003/0201225 | A1 * | 10/2003 | Josse et al. | 210/605 |

FOREIGN PATENT DOCUMENTS

CA       2196522 C  *  6/2004  ............ B01D 21/02

* cited by examiner

Primary Examiner — Nam Nguyen
Assistant Examiner — Nader Hossaini
(74) Attorney, Agent, or Firm — Davis & Bujold, PLLC; Michael J. Bujold

(57) ABSTRACT

One embodiment of the invention disclosed is an apparatus for separating a solid material from a mixture containing oil, water, clay, sand, soil and drill cuttings. The apparatus comprise a series of processing cells and wash tanks. Hydrocyclonic devices are also used to further purify the solid mixture for disposal.

6 Claims, 4 Drawing Sheets

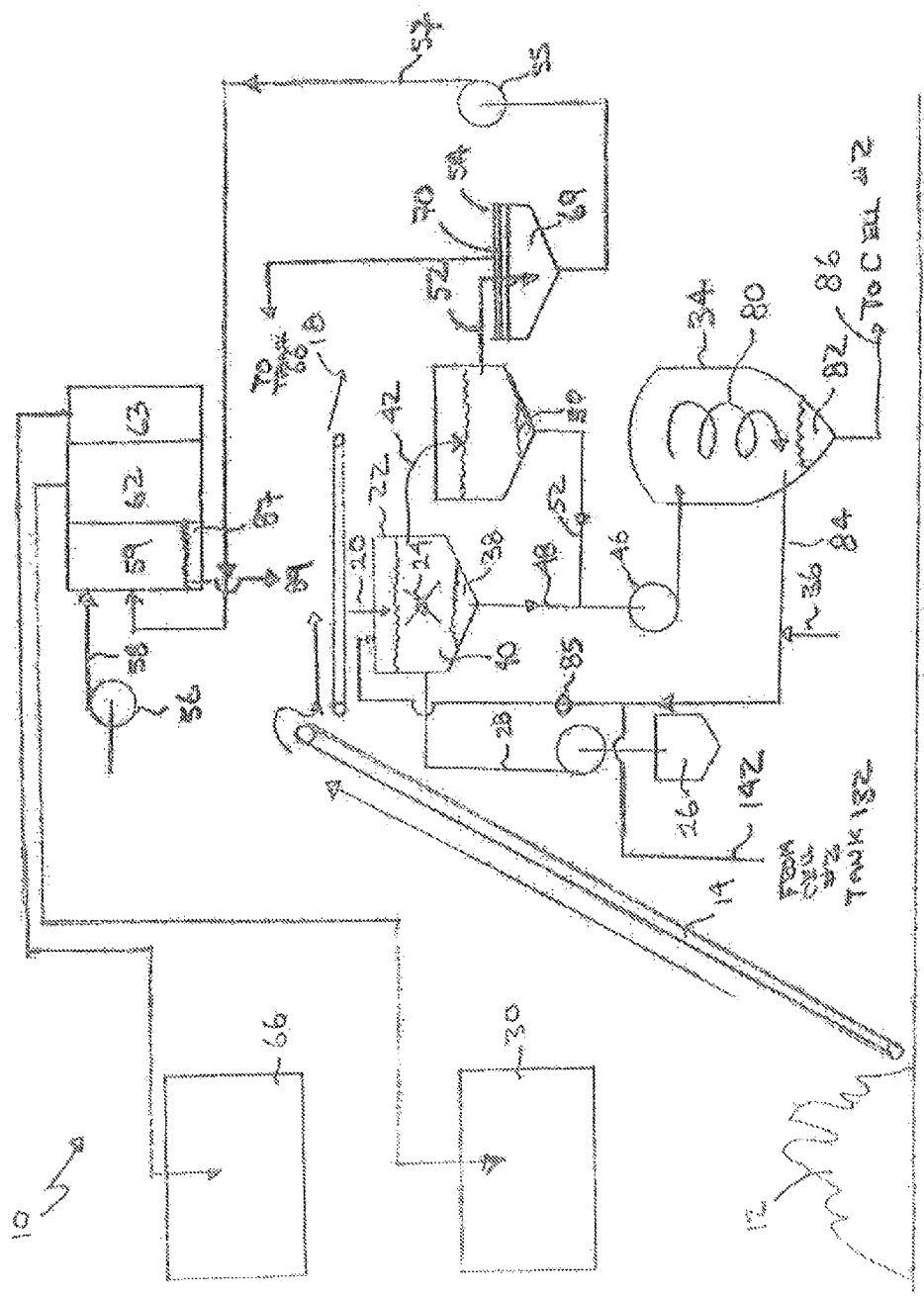

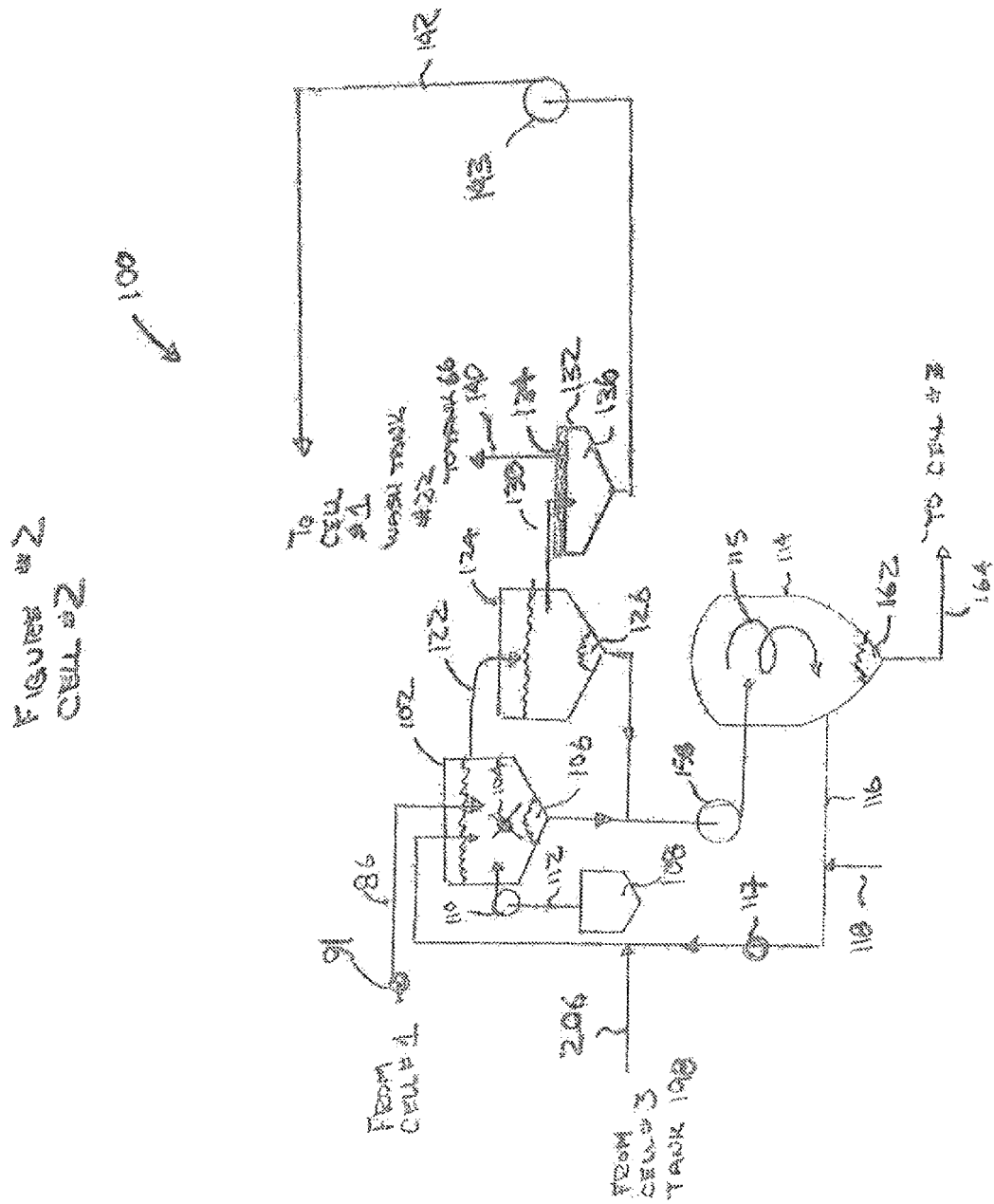

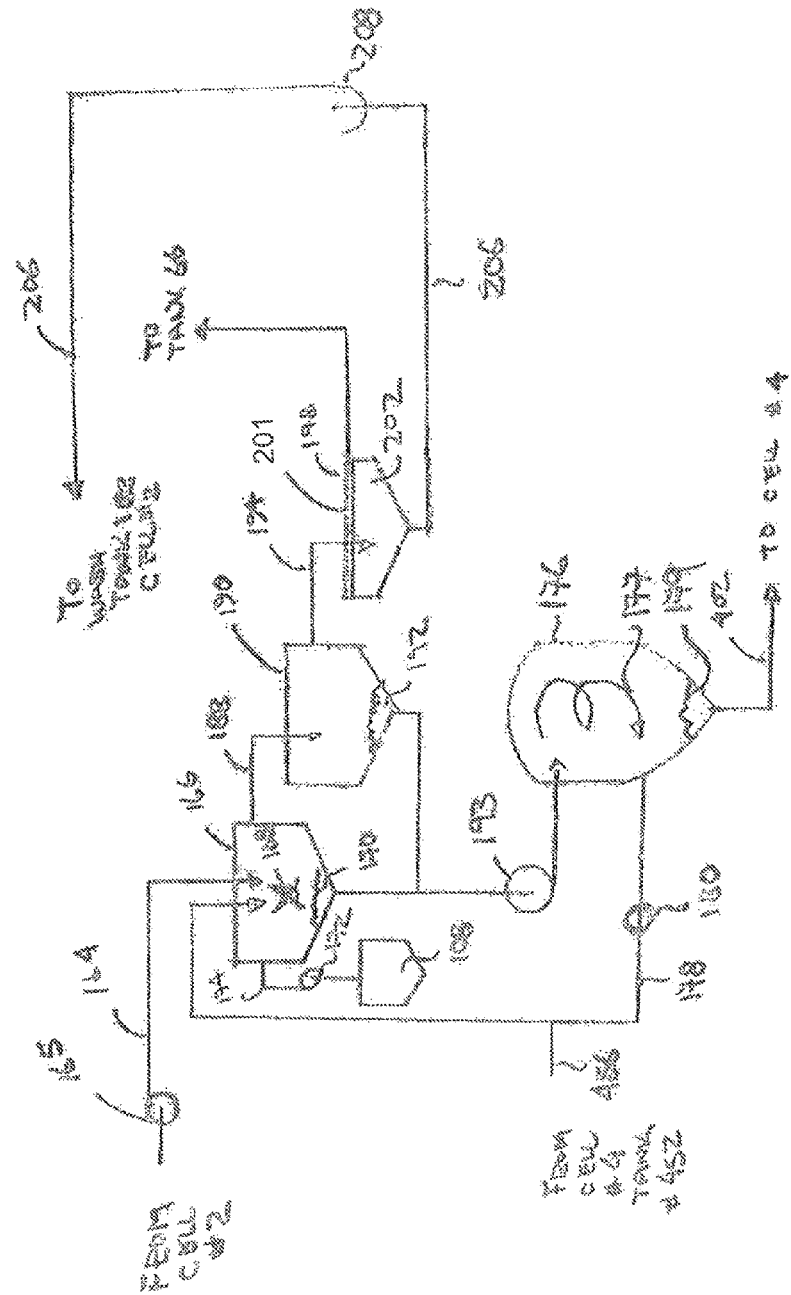

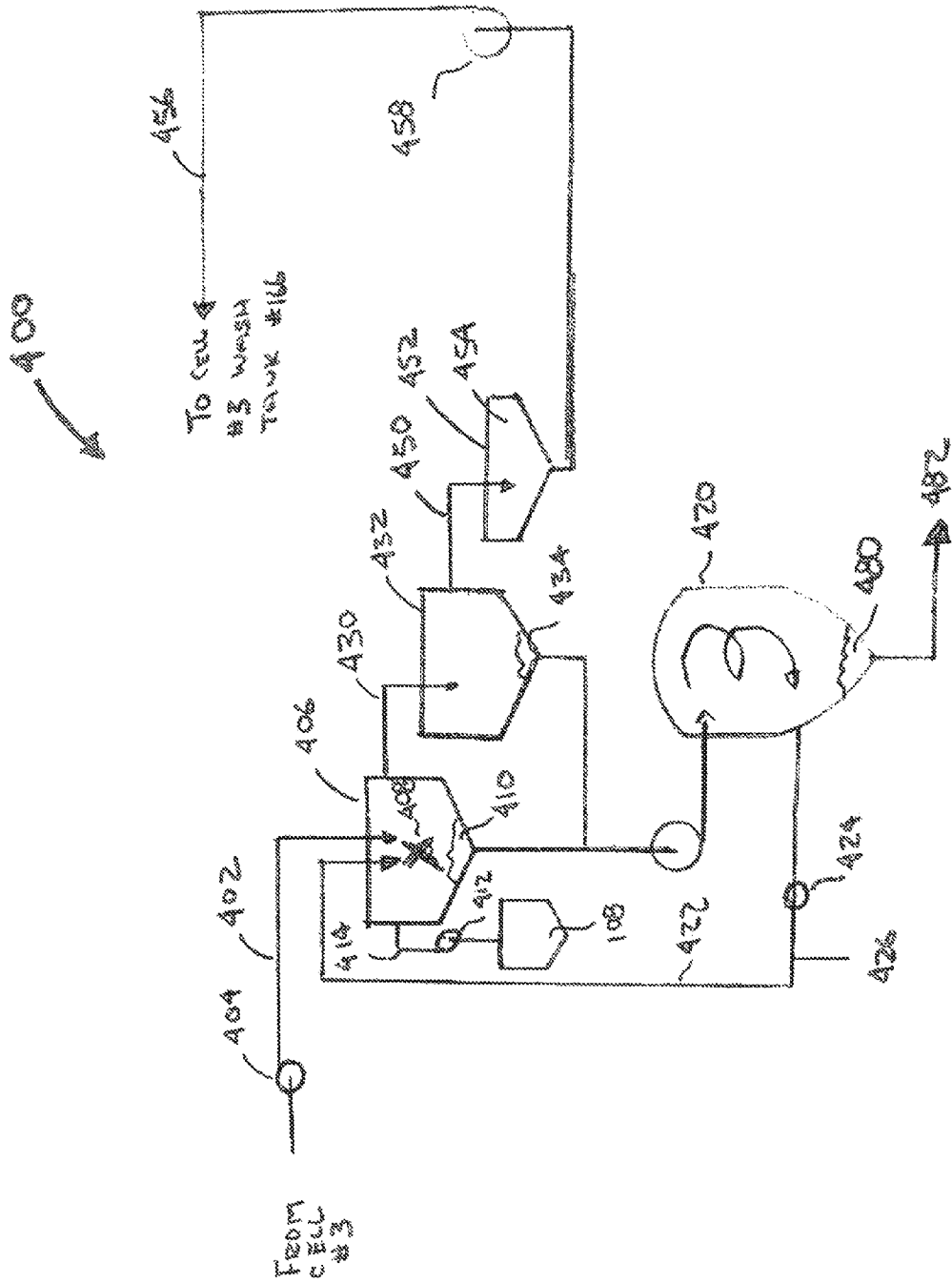

APPARATUS AND METHOD FOR THE TREATMENT OF OIL, WATER, CUTTINGS, SAND, SOIL AND CLAY MIXTURES

CROSS-REFERENCE TO RELATED APPLICATIONS

This application claims the benefit of U.S. Provisional Patent Application Ser. No. 61/354,162 filed on Jun. 11, 2011 by the present inventor.

FEDERAL SPONSORED RESEARCH

N/A

FIELD OF THE INVENTION

This invention is related to the field of the treatment of oil, water and sand mixtures and specifically to an improved apparatus and method for the treatment of oil, water, cuttings, sand, soil and clay mixtures.

BACKGROUND

My issued Canadian patent #2196522 is relevant to this application. This invention has been improved to address the requirements of drilling in shale formations. The invention has been improved to address the cleaning of cuttings, sand, clay, soil and oil and water mixtures in shale drilling operations.

SUMMARY OF THE INVENTION

In accordance with one embodiment of the invention is an apparatus for separating a solid material from a mixture containing oil, water and solid material.

In a further embodiment of the invention the apparatus comprises: a source of a mixture containing oil, water and sold material; a conveying means for conveying the mixture from the source to a first processing cell; means for conveying first cell processed material from the first processing cell to a second processing cell; means for conveying second cell processed material from the second processing cell to a third processing cell; means for conveying third cell processed material from the third processing cell to a fourth processing cell; means for conveying fourth cell processed material from the fourth processing cell to a disposal.

The solid mixture or feed stock to be processed by the apparatus comprises drill cuttings and clay particulates from oil and gas drilling operations through a variety of formations including shale formations.

A conveyor belt is used to move the feed stock from the source of the feed stock to the first processing cell.

In another embodiment of the invention the first processing cell comprises a shaker conveyor disposed above a wash tank. The shaker conveyor separates unwanted material from the mixture and conveys it to a disposal site. A wash tank receives the mixture from the shaker conveyor. The wash tank includes an agitation means; a chemical addition means for adding emulsifying chemicals to the mixture in the wash tank during operation of the agitation means; a water inlet for receiving a continuous flow of clean water into the wash tank; a wash tank outlet for removing a first amount of settled material from the wash tank; and, a first overflow means for transferring a first refined mixture to a settling tank.

The settling tank comprises a second settled material outlet for removing a second amount of settled material from the settling tank; and, a second overflow means for transferring a second refined mixture to a transfer tank. The transfer tank comprises a third settled material outlet for removing a third amount of settled material from the transfer tank, a second chemical addition means for adding a first flocculent, a third chemical addition means for adding a second flocculent, water transfer means for transferring clean water from the transfer tank to a storage tank; and, oil transfer means for transferring separated oil from the transfer tank to an oil storage tank.

In still a further embodiment of the invention the apparatus comprising a hydrocyclonic separator in communication with the wash tank and the settling tank. The first amount of settled material from the wash tank and the second amount of settled material from the settling tank are transferred to the hydrocyclonic separator for separating water from the first and second amounts of settled material and forming the first cell processed material. The first cell processed material is transferred to the second processing cell.

The second cell comprises a second wash tank for receiving the first cell processed material and forming a first cell processed mixture. The second wash tank comprises a second wash tank agitation means; a second wash tank chemical addition means for adding emulsifying chemicals to the first cell processed mixture in the second wash tank during operation of the second agitation means; a second water inlet for receiving a second continuous flow of clean water; a fourth wash tank outlet for removing a fourth amount of settled material from the second wash tank; and, a third overflow means for transferring a third refined mixture to a second settling tank.

The second settling tank comprises a fifth settled material outlet for removing a fifth amount of settled material from the second settling tank; and, a fourth overflow means for transferring a fourth refined mixture to a second transfer tank.

The second transfer tank comprises a sixth settled material outlet for removing a sixth amount of settled material from the second transfer tank; a fourth chemical addition means for adding the first flocculent; a fifth chemical addition means for adding the second flocculent; a second water transfer means for transferring clean water from the second transfer tank to the water storage tank; and, a second oil transfer means for transferring separated oil from the second transfer tank to the oil storage tank.

The apparatus of the invention further comprises a second hydrocyclonic separator in communication with the second wash tank and the second settling tank, wherein the fourth amount of settled material from the second wash tank and the fifth amount of settled material from the second settling tank are transferred to the second hydrocyclonic separator for separating water from the fourth and fifth amounts of settled material and forming the second cell processed material. Means are provided for transferring the second cell processed material to the third processing cell. The third processing cell forms a third cell processed material which is transferred to a fourth processing cell. The fourth processing cell forms a fourth cell processed material.

The invention also includes a method for separating a solid material from a mixture containing oil, water and said solid material. The method comprises the following steps:

a. obtaining a source of the mixture;

b. conveying the mixture from the mixture source to a first processing cell;

c. processing the mixture in the first processing cell to form a first cell processed mixture;

d. conveying the first cell processed mixture from the first processing cell to a second processing cell;

e. processing the first cell processed mixture in the second processing cell to form a second cell processed mixture;

f. conveying the second cell processed mixture from the second processing cell to a third processing cell;

g. processing the second cell processed mixture in the third processing cell to form a third cell processed mixture;

h. conveying the third cell processed mixture from the third processing cell to a fourth processing cell; and, i. processing the third cell processed mixture in the fourth processing cell to form a fourth cell processed mixture.

ADVANTAGES

Accordingly, several advantages of one or more aspects of the invention are as follows: to provide an apparatus that is able to effectively separate water, oil and solid mixtures for disposal and reprocessing to mitigate pollution associated with traditional disposal method. The invention has a further advantage of being able to process sand, clay, soil and drill cuttings from formations in the field of gas and oil exploration. Specifically, the apparatus and method of the invention can separate oil and water from a mix of solid materials found when drilling through shale formations. Other advantages of one or more aspects of the invention will be apparent from a consideration of the drawings and ensuing description.

DRAWINGS

FIG. 1 is a schematic view of one embodiment of the invention.

FIG. 2 illustrates a separation cell of another embodiment of the invention.

FIG. 3 illustrates another separation cell of yet another embodiment of the invention.

FIG. 4 illustrates yet another separation cell of another embodiment of the invention.

DETAILED DESCRIPTION

Referring to FIG. 1, there is shown schematically a first separation cell (Cell #1) of one embodiment of the invention 10. A mixture of water, oil, clay, sand, soil and shale formation cuttings 12 is obtained from shale drilling operations. The mixture is conveyed by a conveyor 14 to a shaker screen where trash and oversize rock is separated from mixture and sent to disposal or further treatment 18. The graded mixture 20 is delivered to wash tank 22. Wash tank 22 is an agitation tank having powered agitation means 24 to separate light from heavy particular matter. Suitable chemicals 26 are added 28 to the wash tank 22 to promote separation of oil from the cuttings, clay and other materials. The chemicals are specially formulated to suit the composition of the mixture 12. The composition of mixture 12 is dependent on the location of the drilling operation. For example, the chemicals added from tank 26 in Oklahoma will be different from the chemicals added in Mexico. Water is also continually added to the wash tank 22. The water used in the wash tank is recycled water from the process as further described below. Water can also be sourced from a local system 36.

Once the mixture is added to the wash tank 22 the agitation 24 begins and forms a froth emulsion. Heavy cuttings 38 will fall to the bottom of the wash tank. Lighter particles will remain in suspension 40 and the froth will be floating on top of the wash tank. The wash tank is designed so that it continuously receives mixture and water. The wash tank will overflow 42 into settling tank 44 taking with it the oil froth and lighter particles in suspension. The heavy cuttings 38 at the bottom of the wash tank 22 will be pumped out of the wash tank by pump 46 by way of line 48. The heavy cuttings are transferred to the hydrocyclonic separator 34. Within the settling tank 44, heavier particles 50 will settle to the bottom of the tank. They will also be pumped out of the tank by way of line 52 and pump 46 and transferred to the hydrocyclonic separator 34. Water, oil and lighter particles suspended in water will overflow 52 from the settling tank 44 to the transfer tank 54. Water and suspended particles 69 within transfer tank 54 will be continually transferred by pump 55 and line 57 to treatment tank 59. An oil layer 70 will accumulate on the top of the water 69 and will be removed once it accumulates to certain thickness and transferred to tank 66.

In tank 59, two types of quick settling flocculants are pumped into the treatment tank by way of pump 56 and line 58. The resulting clarified water is held in tank 62 and then pumped into tank 30 for storage. Separated oil is held in tank 63 and pumped into oil holding tank 66.

The heavier cuttings 38 and heavier particles 50 which have settled to the bottom of wash tank 22 and settling tank 44 respectively are pumped to the hydrocyclonic separator 34 by pump 46. Vortex separation is used to separate the water from the particulate matter. Clean water 80 is recycled from the separator back to the wash tank 22 by line 84 and pump 85. Particulate matter 82 which is collected in the hydrocyclonic separator is transferred by way of line 86 to a second separation cell (Cell #2). The material 87 collected at the bottom of the treatment tank 59 is periodically augured out of the tank and transferred 89 to a clean waste disposal site.

Referring to FIG. 2, there is illustrated a second separation cell 100 (Cell #2) that receives the material from hydrocyclone 34 in Cell #1 by way of line 86 and pump 91. The material is transferred into wash tank 102 having agitation means 104. The material is agitated so that heavier particulate materials 106 will fall to the bottom of the tank 102. An emulsifier 108 is added to the wash tank 102 by way of pump 110 and line 112. Emulsifier 108 is formulated specially to suit the composition of the material and helps form a froth of oil and water which floats on the surface of the tank. Water is continually added to the wash tank 102 either from the hydrocyclonic separator 114 by way of line 116, from an on-site system by way of line 118 and by recycling water from the transfer tank in cell #3 shown in FIG. #1.

Froth material and lighter clay particles in suspension will overflow 122 from the wash tank 102 into the settling tank 124. Heavier material 126 will fall out of suspension and settle to the bottom of the tank 124. A mixture of oil, water and fine particles will overflow 130 into transfer tank 132 forming a layer of oil 134 and clean water 136. The oil can be skimmed off of the surface and transferred to oil storage tank 66 by way of line 140 on a periodic basis. The water 136 is transferred by line 142 and pump 143 back to cell #1 wash tank #22.

The heavier cuttings 106 and heavier particles 126 which have settled to the bottom of wash tank 102 and settling tank 124 respectively are pumped to the hydrocyclonic separator 114 by pump 158. Vortex separation is used to separate the water from the particulate matter. Clean water 115 is recycled from the separator 114 back to the wash tank 102 by line 116 pump 117. Particulate matter 162 which is collected in the hydrocyclonic separator is transferred by way of line 164 to a third separation cell (Cell #3) wash tank 166.

Referring to FIG. 3, there is shown Cell #3 (200) that receives the material from hydrocyclone 114 in Cell #2 by way of line 164 and pump 165. The material is transferred into wash tank 166 having agitation means 168. The material is agitated so that heavier particulate materials 170 will fall to the bottom of the tank 166. An emulsifier 108 is added to the wash tank 166 by way of pump 172 and line 174. Emulsifier 108 is formulated specially to suit the composition of the material and helps form a froth of oil and water which floats on the surface of the tank. Water is continually added to the wash tank 166 either from the hydrocyclonic separator by way of line 178 and pump 180, from an on-site system by way of line 182 and by recycling water from the transfer tank in cell #4.

Froth material and lighter particles in suspension will overflow 188 from the wash tank 166 into the settling tank 190. Heavier material 192 will fall out of suspension and settle to the bottom of the tank 190. A mixture of oil, water and particles will overflow 194 into transfer tank 198 forming a layer of oil 201 and clean water 202. The oil can be skimmed off of the surface and transferred to oil storage tank 66 by way of line 204 on a periodic basis. The water 202 is transferred by line 206 and pump 208 back to cell #2 wash tank #102.

The heavier cuttings 170 and heavier particles 192 which have settled to the bottom of wash tank 166 and settling tank 190 respectively are pumped to the hydrocyclonic separator 176 by pump 193. Vortex separation is used to separate the water from the particulate matter. Clean water 177 is recycled from the separator 176 back to the wash tank 166 by line 178 and pump 180. Particulate matter 179 which is collected in the hydrocyclonic separator 176 is transferred by way of line 402 and pump 404 to a fourth separation cell (Cell #4).

Referring to FIG. 4, there is shown Cell #4 (400) that receives the material from hydrocyclone 176 in Cell #3 by way of line 402 and pump 404. The material is transferred into wash tank 406 having agitation means 408. The material is agitated so that heavier particulate materials 410 will fall to the bottom of the tank 406. An emulsifier 108 is added to the wash tank 406 by way of pump 412 and line 414. Emulsifier 108 is formulated specially to suit the composition of the material and helps form a froth of oil and water which floats on the surface of the tank. Water is continually added to the wash tank 406 either from the hydrocyclonic separator 420 by way of line 422 and pump 424 or from an on-site system by way of line 426.

Froth material and lighter particles in suspension will overflow 430 from the wash tank 406 into the settling tank 432. Heavier material 434 will fall out of suspension and settle to the bottom of the tank 432. A mixture of oil, water and particles will overflow 450 into transfer tank 452. By this stage there is no oil on the surface of the water in the transfer tank 452. The water 454 is transferred by line 456 and pump 458 back to cell #3 wash tank #166.

Material 480 that is collected by hydrocyclonic separator 420 is transferred 482 to a clean material storage site.

Although the description above contains much specificity, these should not be construed as limiting the scope of the embodiments but as merely providing illustrations of some of the several embodiments. Thus the scope of the invention should be determined by the appended claims and their legal equivalents rather than by any examples given.

What is claimed is:

1. An apparatus for separating particulate matter from a mixture containing oil, water and said particulate matter, said apparatus comprising:
   a plurality of separation cells arranged for sequential treatment of particulate matter, each separation cell including a wash tank, a settling tank, a liquids transfer tank and a hydrocyclone separator;
   the wash tank receiving a continuous flow of the mixture containing oil, water and particulate matter and having an agitator which agitates the mixture;
   the settling tank receiving continuous overflow from the wash tank, with the particulate matter which settles to the bottom of the settling tank being pumped through a line from the settling tank to the hydrocyclone separator;
   the hydrocyclone separator separating water from the particulate matter, the particulate matter being forwarded through a line to a next one of the plurality of separation cells for further processing and the water being recycled through a line back to the wash tank; and
   the transfer tank receiving continuous overflow from the settling tank, oil accumulating in the transfer tank being periodically pumped to oil storage as determined by a rate of oil accumulation and water being continually pumped from the transfer tank into the line leading from the hydrocyclonic separator to the wash tank of a prior one of the plurality of separation cells.

2. The apparatus of claim 1, wherein, where there is no prior one of the plurality of separation cells, the water continually pumped from the transfer tank passes through a line to a treatment tank for further treatment.

3. The apparatus of claim 1, wherein a chemical reservoir and pump are provided to send chemicals through a line to the wash tank to promote separation of the oil from the particulate matter.

4. A method for separating particulate matter from a mixture containing oil, water and said particulate matter, said method comprising:
   providing a plurality of separation cells arranged for sequential treatment of particulate matter, each separation cell including a wash tank, a settling tank, a liquids transfer tank and a hydrocyclone separator;
   passing a continuous flow of the mixture containing oil, water and particulate matter into the wash tank, the wash tank having an agitator which agitates the mixture;
   passing a continuous overflow from the wash tank into the settling tank, with the particulate matter which settles to the bottom of the settling tank being pumped through a line from the settling tank to the hydrocyclone separator;
   using the hydrocyclone separator to separate water from the particulate matter, the particulate matter being forwarded to a next one of the plurality of separation cells for further processing and the water being recycled back to the wash tank; and
   passing a continuous overflow from the settling tank to the transfer tank receiving, oil accumulating in the transfer tank being periodically pumped to oil storage as determined by a rate of oil accumulation and water being continually pumped from the transfer tank into the line leading from the hydrocyclonic separator to the wash tank of a prior one of the plurality of separation cells.

5. The method of claim 4, wherein, where there is no prior one of the plurality of separation cells, the water continually pumped from the transfer tank passes through a line to a treatment tank for further treatment.

6. The method of claim 4, wherein a chemical reservoir and pump are provided and a further step is taken of sending chemicals through a line to the wash tank to promote separation of the oil from the particulate matter.

* * * * *